(12) United States Patent
Hirooka et al.

(10) Patent No.: US 10,911,709 B2
(45) Date of Patent: Feb. 2, 2021

(54) ONBOARD APPARATUS

(71) Applicant: HONDA MOTOR CO., LTD., Tokyo (JP)

(72) Inventors: Mutsuki Hirooka, Wako (JP); Kenta Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/671,523

(22) Filed: Nov. 1, 2019

(65) Prior Publication Data
US 2020/0169689 A1    May 28, 2020

(30) Foreign Application Priority Data
Nov. 26, 2018  (JP) .................. 2018-220586

(51) Int. Cl.
*H04N 5/58* (2006.01)
*G07C 5/08* (2006.01)
*B60R 1/00* (2006.01)
*H04N 5/247* (2006.01)
*H04N 5/235* (2006.01)
*B60R 11/04* (2006.01)
*B60R 11/00* (2006.01)

(52) U.S. Cl.
CPC ............... *H04N 5/58* (2013.01); *B60R 1/00* (2013.01); *G07C 5/08* (2013.01); *H04N 5/2351* (2013.01); *H04N 5/2352* (2013.01); *H04N 5/247* (2013.01); *B60R 11/04* (2013.01); *B60R 2011/004* (2013.01); *B60R 2300/105* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 2007/0115138 A1* | 5/2007 | Arakawa | B60R 1/00 340/901 |
| 2012/0092497 A1* | 4/2012 | Hoetzer | B60R 1/04 348/148 |
| 2017/0129405 A1* | 5/2017 | Oba | B60R 1/08 |
| 2017/0313250 A1* | 11/2017 | Fischer | H04N 5/235 |
| 2018/0018939 A1* | 1/2018 | Choi | B60R 1/00 |

FOREIGN PATENT DOCUMENTS

JP         5118605 B2    1/2013

* cited by examiner

*Primary Examiner* — Frederick D Bailey
(74) *Attorney, Agent, or Firm* — Thomas | Horstemeyer, LLP

(57) ABSTRACT

An onboard apparatus provided in a vehicle with an automatic transmission, includes a peripheral image display unit configured to capture a periphery of the vehicle and display a captured image, an acquisition unit configured to acquire information concerning brightness on the periphery of the vehicle, and a setting change unit configured to change a setting of the peripheral image display unit based on the information acquired by the acquisition unit and a shift range of the automatic transmission.

8 Claims, 8 Drawing Sheets

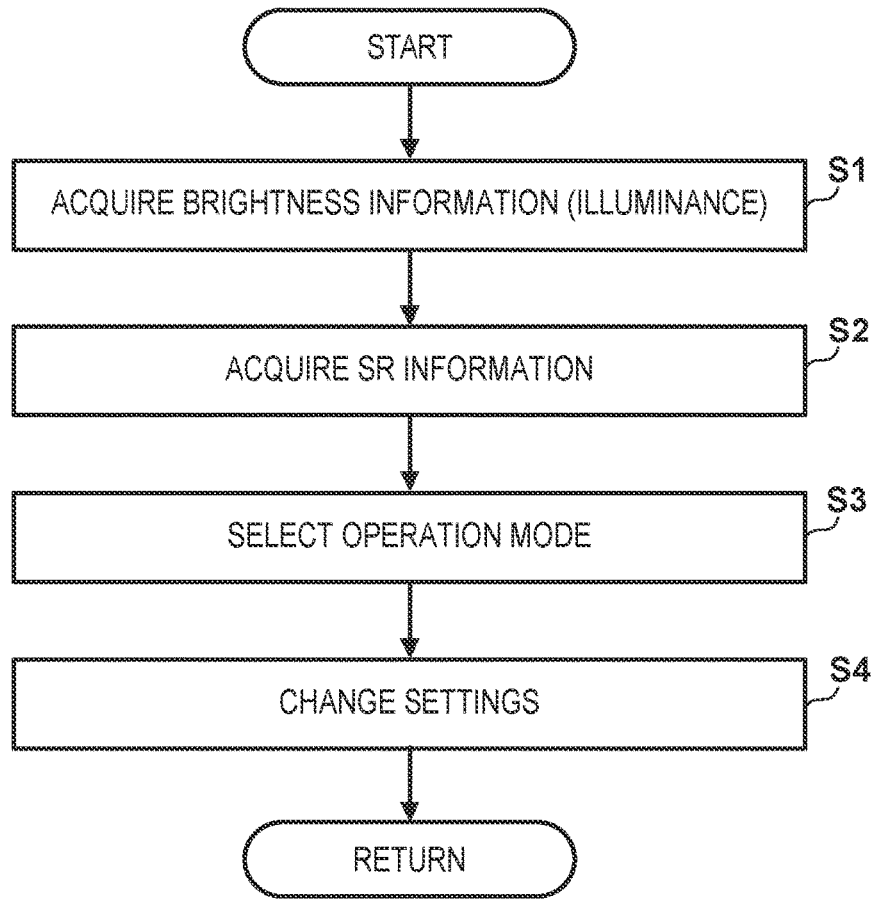

| MODE | | | |
|---|---|---|---|
| TYPE | | BRIGHTNESS | SHIFT RANGE |
| A | A1 | BRIGHT (DAYTIME) | — |
|  | A2 | ONE SIDE IS DARK | — |
| B | B1 | DIM (DAWN, EVENING) | — |
|  | B2 | ONE SIDE IS BRIGHT | — |
| C | C11 | DARK (NIGHTTIME) | D/P/N |
|  | C12 |  | R |
|  | C21 | ONE SIDE IS BRIGHT | D/P/N |
|  | C22 |  | R |

FIG. 8A

| TYPE | MODE | | TIME ZONE |
|---|---|---|---|
| | BRIGHTNESS | SHIFT RANGE | |
| A | BRIGHT (DAYTIME) | — | 8:00-16:00 |
| B | DIM (DAWN, EVENING) | — | 6:00-8:00 16:00-18:00 |
| C  C1 | NIGHTTIME | D/P/N | 18:00-6:00 |
| C  C2 | | R | |

FIG. 8B

| TYPE | | MODE | | TIME ZONE |
|---|---|---|---|---|
| | | BRIGHTNESS | SHIFT RANGE | |
| A | A1 | BRIGHT (DAYTIME) | — | 8:00-16:00 |
| A | A2 | CLOUDY/RAIN | — | |
| B | B1 | DIM (DAWN, EVENING) | — | 6:00-8:00 16:00-18:00 |
| B | B2 | CLOUDY/RAIN | — | |
| C | C1 | NIGHTTIME | D/P/N | 18:00-6:00 |
| C | C2 | | R | |

ONBOARD APPARATUS

CROSS-REFERENCE TO RELATED APPLICATION(S)

This application claims priority to and the benefit of Japanese Patent Application No. 2018-220586 filed on Nov. 26, 2018, the entire disclosure of which is incorporated herein by reference.

BACKGROUND OF THE INVENTION

Field of the Invention

The present invention relates to an onboard apparatus.

Description of the Related Art

There has been proposed a system configured to capture the periphery of a vehicle by a camera and display a captured image to an occupant. Japanese Patent No. 5118605 proposes changing a display form depending on a vehicle speed or brightness (daytime, night, or the like) on the periphery of a vehicle in such a system.

In Japanese Patent No. 5118605, however, the relationship between an automatic transmission and system settings is not taken into consideration, and there is room for improvement concerning this point.

SUMMARY OF THE INVENTION

It is an object of the present invention to provide a peripheral image to an occupant in consideration of the state of an automatic transmission.

According to an aspect of the present invention, there is provided an onboard apparatus provided in a vehicle provided with an automatic transmission, comprising: a peripheral image display unit configured to capture a periphery of the vehicle and display a captured image; an acquisition unit configured to acquire information concerning brightness on the periphery of the vehicle; and a setting change unit configured to change a setting of the peripheral image display unit based on the information acquired by the acquisition unit and a shift range of the automatic transmission.

Further features of the present invention will become apparent from the following description of exemplary embodiments (with reference to the attached drawings).

BRIEF DESCRIPTION OF THE DRAWINGS

FIG. 4 is a flowchart showing an example of processing executed by the onboard apparatus shown in FIG. 3;

FIG. 5 is a view showing an example of the correspondence relationship between operation modes and system settings;

FIGS. 8A and 8B are views showing examples of operation modes corresponding to time zones.

DESCRIPTION OF THE EMBODIMENTS

First Embodiment

<Arrangement of Vehicle>

Figure 1A:
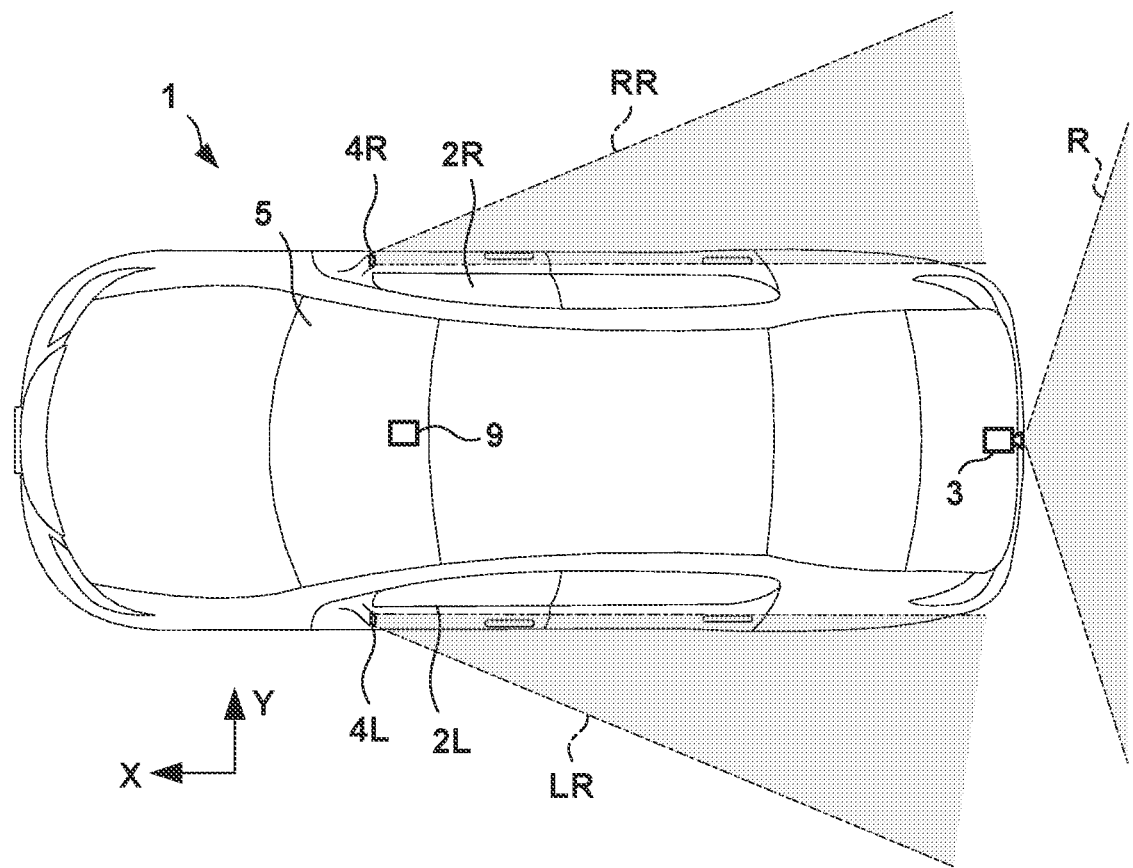
FIGS. 1A and 1B are a plan view and a side view of a vehicle including an onboard apparatus according to an embodiment of the present invention.
Figure 1B:
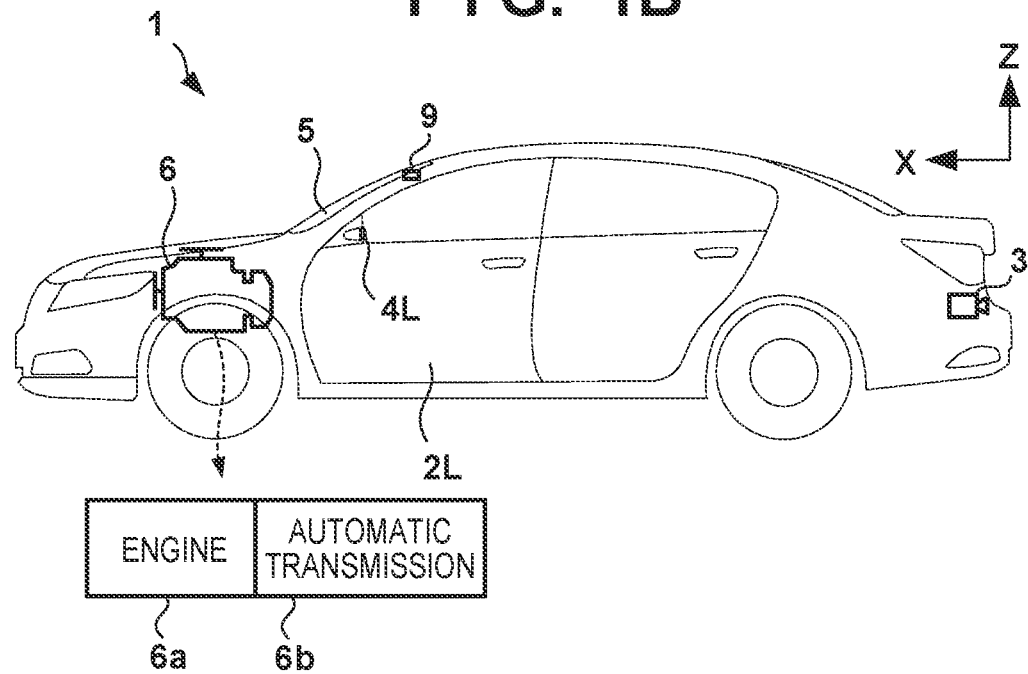

FIGS. 1A and 1B are a plan view and a side view of a vehicle 1 as an application example of the present invention. Note that in the drawings, an arrow X indicates the longitudinal direction of the vehicle 1, and an arrow Y indicates the vehicle width direction of the vehicle 1. An arrow Z indicates the vertical direction.

The vehicle 1 is, for example, a sedan-type four-wheeled vehicle. The vehicle 1 includes two seats in the front row adjacent to a windshield 5, and two seats in the rear row. The right seat in the front row is the driver's seat, and the left seat is the passenger seat. The vehicle 1 includes a total of four doors adjacent to the seats. A door 2R is the door adjacent to the driver's seat, and is the right door on the front side. A door 2L is the door adjacent to the passenger seat, and is the left door on the front side. A driving unit 6 is provided in the front part of the vehicle 1. The driving unit 6 includes a driving source that generates the driving force of the vehicle 1. In this embodiment, the driving source is an engine (internal combustion engine) 6a. The driving unit 6 includes an automatic transmission 6b that changes the driving force of the engine 6a and supplies it to wheels. The automatic transmission 6b may be either a continuously variable transmission or a stepped transmission, and may be either a torque converter type transmission or a dual clutch type transmission.

Note that as the driving source provided in the driving unit 6, an internal combustion engine has been exemplified. However, another driving source such as an electric motor may be employed. Alternatively, the driving source may be formed by a combination of a plurality of devices like a combination of an internal combustion engine and an electric motor.

The vehicle 1 includes image capturing devices 3, 4R, and 4L configured to capture the periphery of the vehicle 1. Each of the image capturing devices 3, 4R, and 4L is, for example, a camera including an image capturing element such as an image sensor and an optical system such as a lens. The image capturing device 3 captures an image in an image capturing range R on the rear side of the vehicle 1. An image captured by the image capturing device 3 is provided to the occupant when, for example, the vehicle 1 moves backward.

The image capturing device 4R is arranged in front of the door 2R, and has an image capturing range RR in the rear on the right side of the vehicle 1. The image capturing device 4L is arranged in front of the door 2L, and has an image capturing range LR in the rear on the left side of the vehicle 1. The image capturing devices 4R and 4L are generically called image capturing devices 4.

An illuminance sensor 9 is arranged on the inner side of the windshield 5 and detects brightness (illuminance) on the periphery of the vehicle 1.

Figure 2:
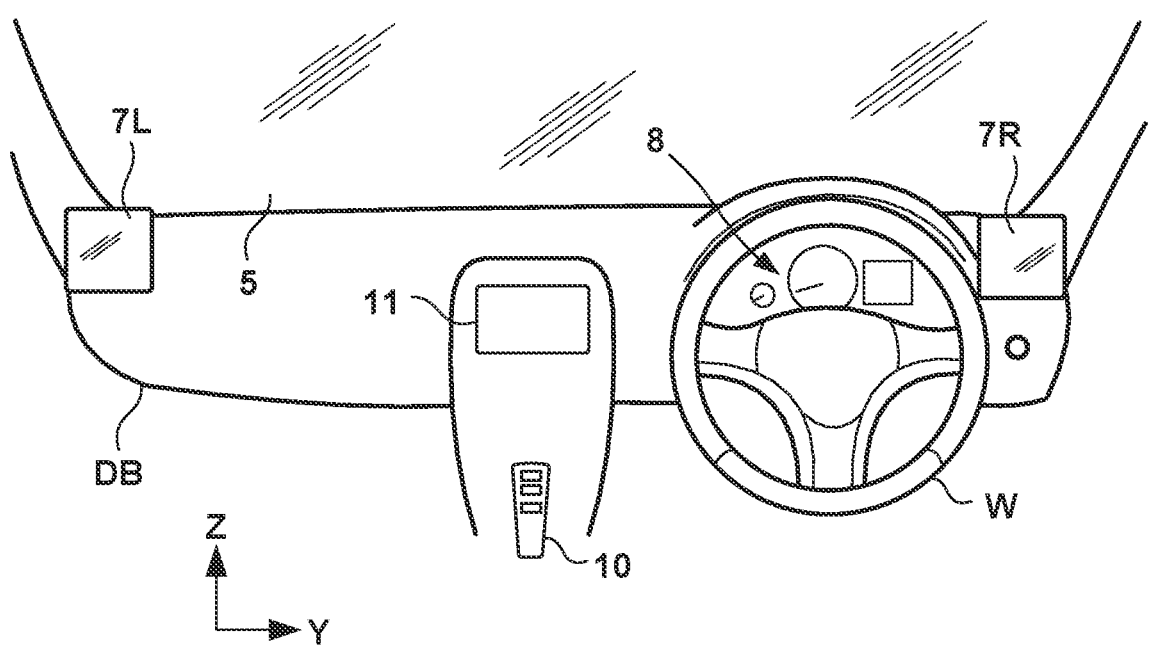
FIG. 2 is a view showing the interior of the vehicle shown in FIGS. 1A and 1B.

FIG. 2 is a view schematically showing the inside of the vehicle 1, and is a view particularly showing the periphery of a dashboard DB. A steering wheel W is provided in front of the driver's seat. On the front side of it, an instrument panel 8 is provided on the dashboard DB. A display device 11 configured to display map information or the like is provided at the center of the dashboard DB in the vehicle width direction. When the vehicle 1 moves backward, an image captured by the image capturing device 3 can be displayed on the display device 11. A shift lever 10 that accepts a shift operation for the automatic transmission 6b is arranged near the display device 11.

Types of shift ranges selectable by the shift lever 10 can appropriately be designed. In this embodiment, the shift ranges include P range (parking range), N range (neutral range), D range (drive range), and R range (reverse range). When the D range is selected, the automatic transmission 6b switches the driving transmission path of the driving force from the engine 6a such that the vehicle 1 moves forward. When the R range is selected, the automatic transmission 6b switches the driving transmission path such that the vehicle 1 moves backward. Note that in place of the shift lever 10, a button type shift range selector may be employed.

A display device 7R is arranged at the right end of the dashboard DB, and a display device 7L is arranged at the left end. Each of the display devices 7R and 7L is an image display device, and is, for example, a liquid crystal display device. An image captured by the image capturing device 4R is displayed on the display device 7R, and an image captured by the image capturing device 4L is displayed on the display device 7L. The display devices 7R and 7L are generically called display devices 7.

The vehicle 1 according to this embodiment is a side-mirrorless vehicle. The image capturing devices 4 and the display devices 7 are peripheral image display systems, in other words, camera monitoring systems (CMS) provided to cause the occupant (in particular, the driver) to confirm the sides and the rear of the vehicle 1 in place of side mirrors (door mirrors). Hence, during traveling of the vehicle 1 including a forward movement/backward movement, the image capturing devices 4 continuously capture the periphery of the vehicle 1, and the display devices 7 continuously display images captured by the image capturing devices 4. Image capturing by the image capturing devices 4 and display by the display devices 7 can always be performed even in a period other than such traveling. For example, the image capturing/display can be started based on the start of use of the vehicle 1 and executed until the end of use of the vehicle 1. The start of use is, for example, door unlock from the outside of the vehicle by the occupant, and the end of use is, for example, door lock from the outside of the vehicle by the occupant.

Figure 3:
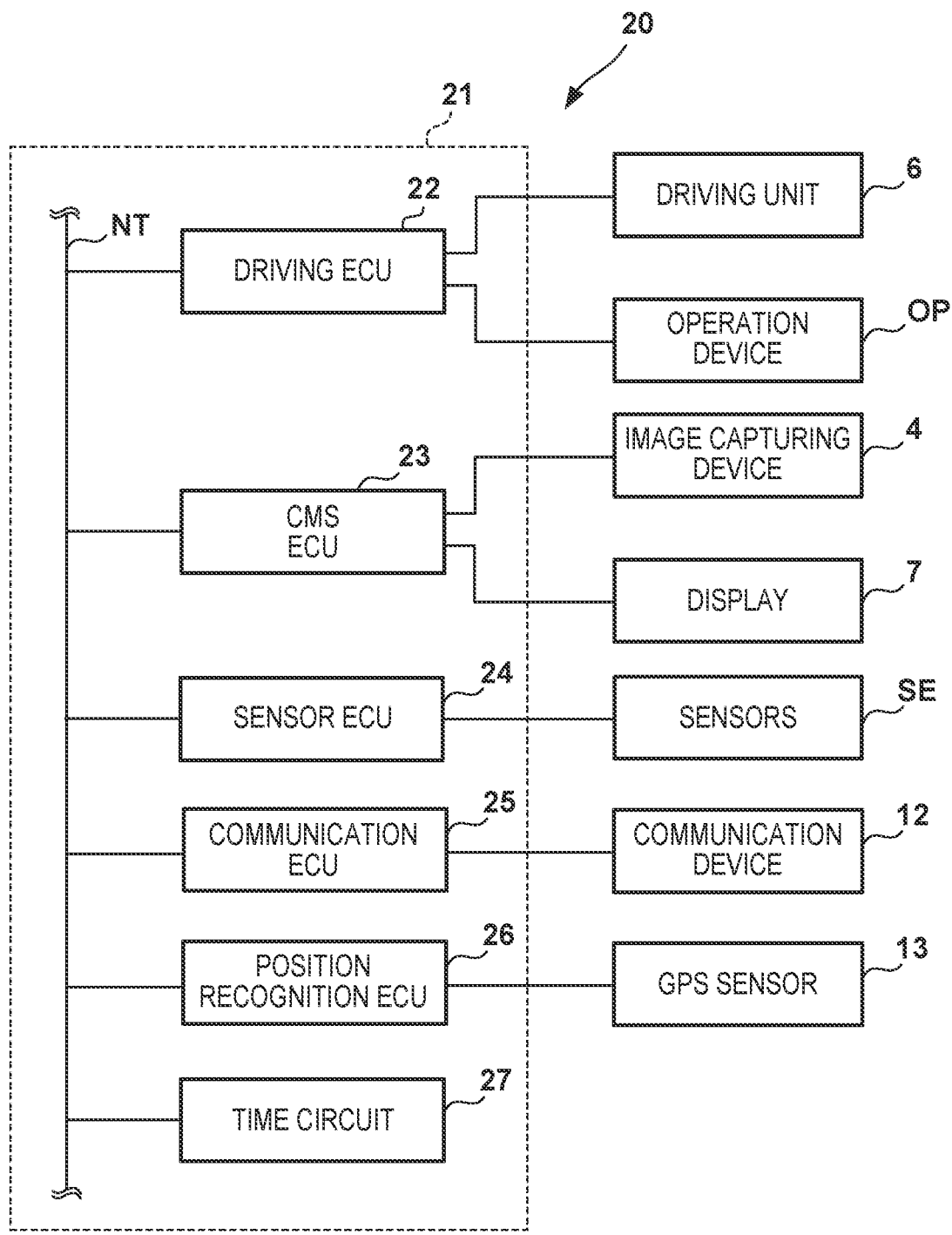
FIG. 3 is a block diagram of the onboard apparatus according to an embodiment of the present invention.

FIG. 3 is a block diagram showing an example of the arrangement of an onboard apparatus 20 of the vehicle 1. The onboard apparatus 20 is a unit configured to control each device in the vehicle 1. FIG. 3 shows only components needed in association with the feature of this embodiment to be described later.

The onboard apparatus 20 includes a control unit 21. The control unit 21 includes a plurality of ECUs (Electric Control Units) 22 to 26. The ECUs are connected to be communicable with each other via an in-vehicle network NT. Each ECU includes a processor represented by a CPU, a storage device such as a semiconductor memory, an interface to an external device, and the like. The storage device stores a program to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment.

The ECU 22 controls the driving unit 6 based on an operation and the like for an operation device OP by the occupant. The operation device OP includes an accelerator pedal, a brake pedal, and the above-described shift lever 10. The ECU 23 controls the image capturing devices 4 and the display devices 7. The ECU 23 also performs image processing such as noise removal and contour enhancement for images captured by the image capturing devices 4. The ECU 23 may include a dedicated processor specialized to such image processing.

The ECU 24 controls sensors SE and acquires a detection result. The sensors SE includes the above-described illuminance sensor 9. The ECU 25 controls a communication device 12 and communicates with an external device. The communication device 12 is a wireless communication device, and the ECU 25 can acquire map information or weather information from, for example, a server on a network such as the Internet. The ECU 26 controls a GPS sensor 13 and acquires a detection result. The current position of the vehicle 1 can be specified by the GPS sensor 13. A time circuit 27 is a circuit that outputs current time information.

Note that in FIG. 3, the names of the representative functions of the ECUs 22 to 26 are given. For example, the ECU 22 is denoted by "driving ECU".

<Example of Processing of Control Unit>

An example of processing of the control unit 21 will be described. FIG. 4 is a flowchart showing an example of setting processing executed by the ECU 23. In this embodiment, the image capturing conditions of the image capturing devices 4, the display conditions of the display devices 7, and the settings of image processing (to be sometimes generically referred to as system settings hereinafter) are changed in accordance with brightness on the periphery of the vehicle 1 and the shift range of the automatic transmission 6b, thereby providing an image easier for the occupant to see. FIG. 4 shows an example of processing concerning such setting change.

In step S1, brightness information is acquired. The brightness information is information about brightness on the periphery of the vehicle 1, and is the detection result of the illuminance sensor 9 in this example. The ECU 23 acquires the detection result of the illuminance sensor 9 via the ECU 24. In step S2, SR (shift range) information is acquired. The SR information is the information of the currently set shift range of the automatic transmission 6b. The ECU 23 acquires the SR information from the ECU 22.

In step S3, a type of the operation mode of the camera monitoring system is selected based on the information acquired in steps S1 and S2. In step S4, the system setting is changed to a setting corresponding to the operation mode selected in step S3. Correspondence information of the operation modes and system settings can be stored in a storage device provided in the ECU 23. Processing of one cycle thus ends. This processing is periodically repetitively performed. This can do system settings corresponding to the current environment.

FIG. 5 shows an example of the correspondence relationship between operation modes and system settings. The operation modes are convenient classifications that define the combinations of system settings. In the example shown in FIG. 5, the operation modes are coarsely classified into three modes A to C, and the mode C is further divided into modes C1 and C2. The mode A is a mode selected when the detection result of the illuminance sensor 9 is relatively bright, and is a mode selected in a case of brightness corresponding to illuminance in daytime. The mode C is a mode selected when the detection result of the illuminance sensor 9 is relatively dark, and is a mode selected in a case of brightness corresponding to illuminance in nighttime. The mode B is a mode selected when the detection result of the illuminance sensor 9 is a result between the mode A and the mode C, and is a mode selected in a case of brightness corresponding to illuminance in dawn or evening. The mode C1 is a mode selected when one of the D range, the N range, and the P range is set as the shift range, and the mode C2 is a mode selected when the R range is set as the shift range.

As for selection of the modes A to CD based on the detection result of the illuminance sensor 9, reference values (thresholds or range values) of illuminance, which divide the modes, are determined in advance, and a mode can be selected by comparing the reference values with the detection result of the illuminance sensor 9. At this time, the reference values may be changed between a case of shift from a bright mode to a dark mode (for example, mode A mode B or mode C) and a case of shift from a dark mode to a bright mode (for example, mode C mode B or mode A), thereby preventing unnecessarily frequent change of mode selection.

Types of system settings can include settings concerning the image capturing conditions of the image capturing devices 4, settings concerning image processing of captured images, and settings concerning the display conditions of the display devices 7. In addition, two or one of the three types of settings may be associated with each operation mode.

The system settings according to this embodiment are settings concerning image capturing conditions, and a sensor sensitivity, an exposure time, and a gain are shown. The sensor sensitivity is the sensitivity of the image capturing elements provided in the image capturing devices 4. At a high sensitivity, image capturing can be performed with a relatively small exposure amount. At a low sensitivity, image capturing can be performed with a relatively large exposure amount. The exposure time is a frame rate here. The exposure amount is small in a relatively short time. The exposure amount is large in a relatively long time. The gain is the amplification factor of a pixel value from the image capturing element, which is converted into a digital signal. With a relatively small gain, the image is dark, but noise tends to be unnoticeable. With a relatively large gain, the image is bright, but noise tends to be noticeable.

Note that as the settings of image processing, noise removal can be set. Noise removal is processing of making noise in an image unnoticeable. If the processing is relatively weak, the noise removing effect is low. If the processing is strong, the noise removing effect is high, but contrast tends to be low.

As the settings of the display conditions, a contrast, a black level, and a saturation can be set. The contrast is the brightness difference of pixels. If the contrast is relatively weak, a vague image is obtained. If the contrast is strong, a clear image is obtained. The black level is the depth of black. If the black level is relatively low, a black part in an image becomes whitish. If the black level is high, the contrast of a black part in an image lowers. The saturation is the vividness of a color. If the saturation is relatively low, the vividness of a color lowers. If the saturation is high, the vividness of a color increases.

The settings are merely examples, and other conditions can also be employed. For example, as for the display devices 7, the illuminance of the backlight can be set.

The relationship between the operation modes and the system settings will be described. In a relatively bright environment, the image capturing conditions are set for low exposure, and the display conditions are set for a brighter image. In a relatively dark environment, the image capturing conditions are set for high exposure, and the display conditions are set for a darker image. This can provide an image easier for the occupant to see.

In a dark environment like nighttime, neon light or headlight of a following vehicle can cause halation in an image. Hence, a measure is taken by discriminating the mode into the modes C1 and C2 by the shift range.

In a case in which the D range is selected, and the vehicle is moving forward, the degree of gaze of the driver on the display devices 7 is lower than in a case in which the R range is selected, and the vehicle is moving backward. This is because during the forward movement, the driver pays much attention to the front. Opportunities to gaze the sides and the rear via the images on the display devices 7 are lane change, right/left turn, and the like, and the frequency is not high. It is therefore possible to provide an image that is not annoying or easier for the driver to see by giving priority to suppression of halation in an image over the visibility of details of an obstacle in the image.

On the other hand, during a backward movement, the driver pays much attention to the sides and the rear to carefully drive the vehicle 1 so as to avoid an obstacle on the periphery, and always gazes the display devices 7. Hence, an image in which the visibility of details of an obstacle in the image is high, that is, a bright image is more convenient for the driver.

From the above-described viewpoint, the gain in the image capturing conditions is set to medium in the mode C1 corresponding to D range selection, and is set to large in the mode C2 corresponding to R range selection. In the former, the brightness of the displayed image is relatively suppressed, and an image with suppressed halation can be provided to the driver. In the latter, the displayed image becomes brighter than in the former, and an image easier to see the sides and the rear can be provided to the driver. For P range or N range selection, the mode C1 in which the driver is estimated to often see the front rather than the rear is associated.

As described above, in this embodiment, system settings are done in correspondence with the driver's intention for the forward movement/backward movement in consideration of the state of the automatic transmission 6b and, more particularly, the state of the shift range, thereby more properly providing a peripheral image to the occupant. As a secondary effect, since the display form of the display devices 7 changes upon a switching operation from the D range to the R range, the driver can recognize that the switching to the R range is accepted.

Note that in the example shown in FIG. 5, the setting of one (gain) of the image capturing conditions is changed in accordance with the shift range. However, the setting of another type of the image capturing conditions may be changed, or the settings of image processing or display conditions may be changed.

Additionally, in the example shown in FIG. 5, the modes C1 and C2 discriminated in accordance with the shift range are set in the mode C. In the mode A or mode B as well, modes that are discriminated in accordance with the shift range may exist. In the mode A or mode B, for example, when the R range is selected, image quality may be improved, or brightness may be adjusted from the viewpoint of improving the recognizability of an obstacle in an image as compared to D range selection.

Second Embodiment

Figure 6A:
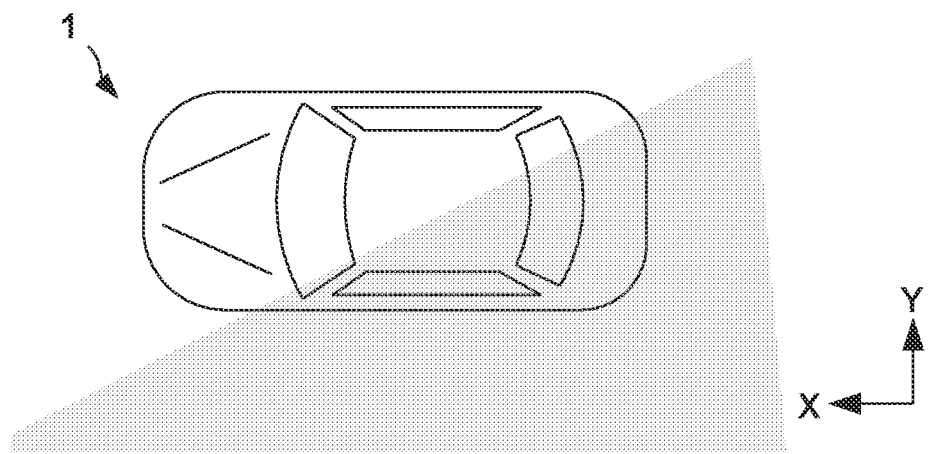
FIGS. 6A and 6B are views showing examples in which illuminance on the periphery of the vehicle is different on the left and right sides.
Figure 6B:
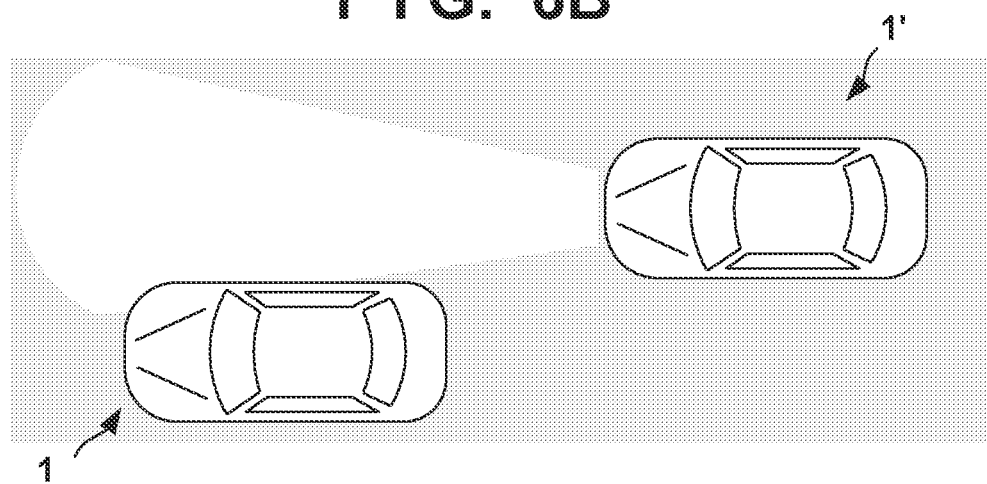

In some cases, brightness on the periphery may be different on the left and right sides of a vehicle 1. FIGS. 6A and 6B show examples. In the example shown in FIG. 6A, the left side of the vehicle 1 is in a shade. Even in daytime, the brightness may be different on the left and right sides of the vehicle 1. In the example shown in FIG. 6B, the right side of the vehicle 1 is illuminated with the headlight of a following vehicle 1' in nighttime. In this way, even in nighttime, the brightness may be different on the left and right sides of the vehicle 1 due to illumination.

If the brightness on the periphery is greatly different on the left and right sides of the vehicle 1, an image easier for the occupant to see can be provided by individually setting the operation mode for the set of an image capturing device 4R and a display device 7R on the right side and the set of an image capturing device 4L and a display device 7L on the left side.

Figure 6C:
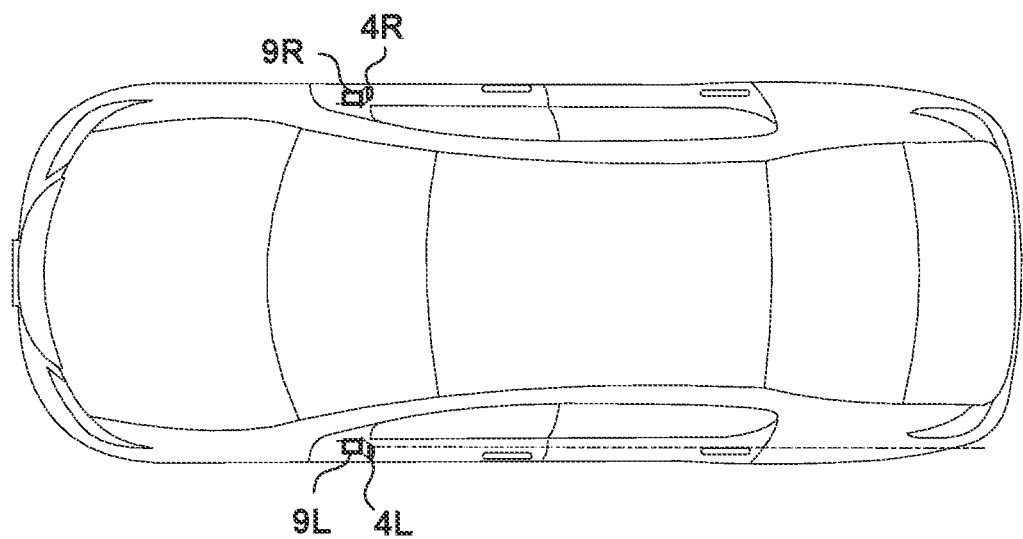
FIG. 6C is a view showing an example of the arrangement of right and left illuminance sensors.

FIG. 6C is a view showing an example of the arrangement of left illuminance sensors 9 for this purpose. In the example shown in FIG. 6C, illuminance sensors 9R and 9L are provided on the right and left sides of the vehicle 1 while being spaced apart. The illuminance sensor 9R is arranged to be adjacent to the image capturing device 4R, and the illuminance sensor 9L is arranged to be adjacent to the image capturing device 4L. For the set of the image capturing device 4R and the display device 7R on the right side, the operation mode is set based on the detection result of the illuminance sensor 9R. For the set of the image capturing device 4L and the display device 7L on the left side, the operation mode is set based on the detection result of the illuminance sensor 9L.

Figures 7A, 7B:
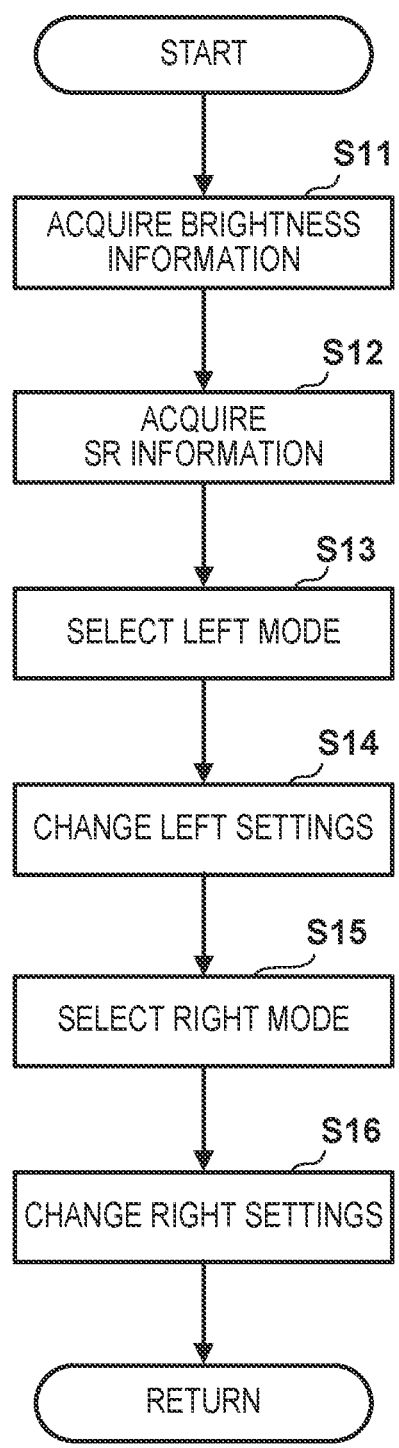
FIG. 7A is a flowchart showing another example of processing executed by the onboard apparatus shown in FIG. 3.
FIG. 7B is a view showing another example of operation modes.

FIG. 7A is a flowchart showing an example of setting processing according to this embodiment. In step S11, brightness information is acquired. An ECU 23 acquires the detection results of the illuminance sensors 9R and 9L via an ECU 24. In step S12, SR information is acquired from an ECU 22. In step S13, the operation mode for the set of the image capturing device 4L and the display device 7L on the left side is selected based on the information acquired in steps S11 and S12. In step S14, the system settings of the set on the left side are changed to settings corresponding to the operation mode selected in step S13. In step S15, the operation mode for the set of the image capturing device 4R and the display device 7R on the right side is selected. In step S16, the system settings of the set on the right side are changed to settings corresponding to the operation mode selected in step S15. Processing of one cycle thus ends. This processing is periodically repetitively performed. This can do system settings corresponding to the current environment.

FIG. 7B shows an example of the types of operation modes according to this embodiment. Although not illustrated, for each operation mode, system settings corresponding to the mode are defined.

A mode A is discriminated into modes A1 and A2. The mode A1 corresponds to the mode A according to the first embodiment, and the mode A2 is an operation mode corresponding to a state in which brightness on the periphery is lower a little. For example, if the brightness is different on the left and right sides of the vehicle 1 in daytime, the mode A1 is selected for the set on the bright side, and the mode A2 is selected for the set on the dark side.

A mode B is also discriminated into modes B1 and B2. The mode B1 corresponds to the mode B according to the first embodiment, and the mode B2 is an operation mode corresponding to a state in which brightness on the periphery is higher a little. For example, if the brightness is different on the left and right sides of the vehicle 1 in dawn or evening, the mode B1 is selected for the set on the dark side, and the mode B2 is selected for the set on the bright side.

A mode C is discriminated into modes C11, C12, C21, and C22. The modes C11 and C12 correspond to the modes C1 and C2 according to the first embodiment, and the modes C21 and C22 are operation modes corresponding to a state in which brightness on the periphery is higher a little. For example, if the brightness is different on the left and right sides of the vehicle 1 in nighttime, the modes C11 and C12 are selected for the set on the dark side, and the modes C21 and C22 are selected for the set on the bright side.

Third Embodiment

In the first embodiment, the detection result of the illuminance sensor 9 is used as brightness information. However, information of another type may be used. In this embodiment, an operation mode is selected using time information acquired from a clock IC 27 as brightness information. FIG. 8A shows the relationship between the types of operation modes and times (time zones). Although not illustrated, for each operation mode, system settings corresponding to the mode are defined.

The operation modes shown in FIG. 8A are the same as the operation modes according to the first embodiment (FIG. 5). A time zone of 8:00 to 16:00 is associated with a mode A, and the mode A is selected almost in the time zone of daytime. A time zone of 6:00 to 8:00 and a time zone of 16:00 to 18:00 are associated with a mode B, and the mode B is selected almost in the time zones of dawn and evening. A time zone of 18:00 to 6:00 of the next day is associated with a mode C, and a mode C1 or C2 is selected almost in the time zone of nighttime. The correspondence relationship between the types of operation modes and the time zones may be changed in accordance with the season.

Even in the same time zone, the brightness on the periphery of a vehicle 1 may change depending on the weather. For example, brightness is lower in a cloudy or rainy weather than in a fine weather. Hence, the information of the weather at the current position of the vehicle 1 may be acquired, and the type of operation mode may be selected based on the time and the weather information.

FIG. 8B shows the relationship between the types of operation modes, times (time zones), and weathers. Although not illustrated, for each operation mode, system settings corresponding to the mode are defined. In the example shown in FIG. 8B, the mode A is discriminated into modes A1 and A2 according to weathers. The mode A1 is a mode selected in a fine weather, and corresponds to the mode A in the example of FIG. 8A. The mode A2 is a mode selected in the same time zone as the mode A1 but in a cloudy or rainy weather, and is a mode selected when the periphery of the vehicle 1 is darker than in the mode A1.

The mode B is also discriminated into modes B1 and B2 according to weathers. The mode B1 is a mode selected in a fine weather, and corresponds to the mode B in the example of FIG. 8A. The mode B2 is a mode selected in the same time zone as the mode B1 but in a cloudy or rainy weather, and is a mode selected when the periphery of the vehicle 1 is darker than in the mode B1.

As for the time zone of nighttime, the mode C is the same as in the example of FIG. 8A from the viewpoint that the influence of brightness by the weather is small.

Figure 9:
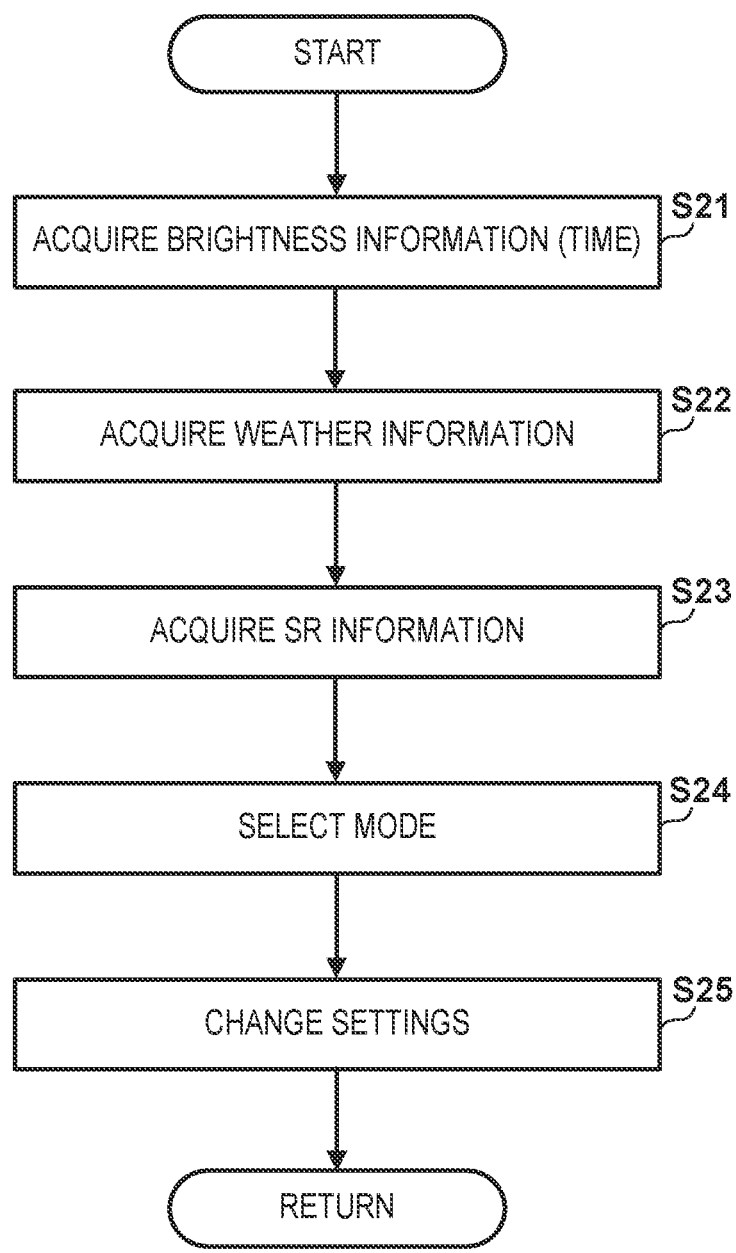
FIG. 9 is a flowchart showing still another example of processing executed by the onboard apparatus shown in FIG. 3.

FIG. 9 is a flowchart showing an example of processing executed by an ECU 23 in a case in which the type of operation mode is selected based on the time and weather, as shown in FIG. 8B. In step S21, brightness information is acquired. In this embodiment, the information of a current time is acquired as brightness information from the time circuit 27. In step S22, weather information is acquired. As for acquisition of weather information, for example, the ECU 23 first acquires the information of the current position of the vehicle 1 from an ECU 26. Then, the ECU 23 requests an ECU 25 to acquire weather information at the current position of the vehicle 1 from a server on a network such as the Internet. The ECU 23 acquires the weather information provided by the ECU 25 in response to the request.

In step S23, SR information is acquired from an ECU 22. In step S24, the type of operation mode of the camera monitoring system is selected based on the information acquired in steps S21 to S23. In step S25, the system settings are changed to settings corresponding to the operation mode selected in step S24. Processing of one cycle thus ends. This processing is periodically repetitively performed. This can do system settings corresponding to the current environment.

Summary of Embodiments

The above-described embodiments disclose at least the following onboard apparatus.

1. An onboard apparatus (for example, 20) according to the above embodiment is
an onboard apparatus provided in a vehicle (for example, 1) with an automatic transmission (for example, 6b), including:
a peripheral image display unit (for example, 4, 7) configured to capture a periphery of the vehicle and display a captured image;
an acquisition unit (for example, 23, S1) configured to acquire information concerning brightness on the periphery of the vehicle; and
a setting change unit (for example, 23, S3, S4) configured to change a setting of the peripheral image display unit based on the information acquired by the acquisition unit and a shift range of the automatic transmission.

According to this embodiment, it is possible to provide a peripheral image to the occupant in consideration of the state of the automatic transmission.

2. In the above embodiment,
the peripheral image display unit continuously captures the periphery of the vehicle and displays the captured image during traveling of the vehicle including a forward movement/backward movement.

According to this embodiment, it is possible to change the setting in correspondence with forward range selection and reverse range selection, and it is also possible to estimate the needs of the occupant upon selecting these ranges and change the setting.

3. In the above embodiment,
the acquisition unit acquires information concerning a time as the information (for example, 23, S21).

According to this embodiment, it is possible to relatively easily determine brightness on the periphery of the vehicle by the time.

4. In the above embodiment,
the acquisition unit further acquires information concerning a weather as the information (for example, 23, S22).

According to this embodiment, it is possible to reflect the difference in brightness on the periphery of the vehicle based on the weather.

5. In the above embodiment,
the peripheral image display unit captures a side and a rear of the vehicle and displays the captured image.

According to this embodiment, it is possible to perform setting change corresponding to the needs of the occupant for side and rear images for which the needs of the occupant concerning the visibility of captured images change in association with selection of the shift range.

6. In the above embodiment,
if it is determined based on the information that the periphery of the vehicle is darker than a reference determined in advance, the setting change unit changes the setting of the peripheral image display unit such that the captured image is displayed brighter in a case in which a reverse range is selected than in a case in which a forward range is selected (for example, FIG. 5).

According to this embodiment, it is possible to suppress halation in image display at the time of forward range selection and provide an image of higher visibility to the occupant at the time of reverse range selection.

7. In the above embodiment,
the peripheral image display unit includes:
a left unit (for example, 4L, 7L) configured to capture a left side and rear of the vehicle and display a captured image; and
a right unit (for example, 4R, 7R) configured to capture a right side and rear of the vehicle and display a captured image, and
the setting change unit individually changes settings of the left unit and the right unit (for example, S14, S16).

According to this embodiment, it is possible to change the setting in correspondence with a situation in which the brightness on the periphery of the vehicle is different on the left and right sides.

8. In the above embodiment,
the vehicle is a side-mirrorless vehicle.

According to this embodiment, it is possible to ensure the visibility of the sides and the rear of the vehicle by the peripheral image display unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An onboard apparatus provided in a vehicle with an automatic transmission, comprising:
a peripheral image display unit configured to capture a periphery of the vehicle and display a captured image, the peripheral image display unit including an image capturing element;
an acquisition unit configured to acquire information concerning brightness on the periphery of the vehicle; and a setting change unit configured to change a setting of the peripheral image display unit based on the information acquired by the acquisition unit and a shift range of the automatic transmission, wherein the setting change unit changes a gain which is an amplification factor of a pixel value from the image capturing element, when the information indicates a first brightness and the shift range is a forward range or a reverse range, the setting change unit sets a first gain as the gain, when the information indicates a second brightness darker than the first brightness and the shift range is the forward range or the reverse range, the setting change unit sets a second gain, which is larger than the first gain, as the gain, when the information indicates a third brightness darker than the second brightness and the shift range is the forward range, the setting change unit sets the second gain as the gain, and when the information indicates the third brightness and the shift range is the reverse range, the setting change unit sets a third gain, which is larger than the second gain, as the gain.

2. The apparatus according to claim 1, wherein the peripheral image display unit continuously captures the periphery of the vehicle and displays the captured image during traveling of the vehicle including a forward movement/backward movement.

3. The apparatus according to claim 1, wherein the acquisition unit acquires information concerning a time as the information.

4. The apparatus according to claim 3, wherein the acquisition unit further acquires information concerning a weather as the information.

5. The apparatus according to claim 1, wherein the peripheral image display unit captures a side and a rear of the vehicle and displays the captured image.

6. The apparatus according to claim 1, wherein
the peripheral image display unit includes:
a left unit configured to capture a left side and rear of the vehicle and display a captured image; and
a right unit configured to capture a right side and rear of the vehicle and display a captured image, and
the setting change unit individually changes settings of the left unit and the right unit.

7. The apparatus according to claim 5, wherein the vehicle is a side-mirrorless vehicle.

8. An onboard apparatus provided in a vehicle with an automatic transmission, comprising:
an image capturing sensor configured to capture a periphery of the vehicle;
a display configured to display a captured image by the image capturing sensor;
at least one processor; and
at least one storage device configured to storage instructions executable by the at least one processor,
wherein, when executed, the instructions case the at least one processor to function as:
an acquisition unit configured to acquire information concerning brightness on the periphery of the vehicle; and
a setting change unit configured to change a setting of the peripheral image display unit based on the information acquired by the acquisition unit and a shift range of the automatic transmission,
wherein the setting change unit changes a gain which is an amplification factor of a pixel value from the image capturing element,
when the information indicates a first brightness and the shift range is a forward range or a reverse range, the setting change unit sets a first gain as the gain,
when the information indicates a second brightness darker than the first brightness and the shift range is the forward range or the reverse range, the setting change unit sets a second gain, which is larger than the first gain, as the gain,
when the information indicates a third brightness darker than the second brightness and the shift range is the forward range, the setting change unit sets the second gain as the gain, and
when the information indicates the third brightness and the shift range is the reverse range, the setting change unit sets a third gain, which is larger than the second gain, as the gain.

* * * * *